United States Patent
Sommer et al.

(10) Patent No.: US 7,128,411 B2
(45) Date of Patent: Oct. 31, 2006

(54) INK SET WITH EXPANDED COLOR GAMUT AND PROCESS FOR USING SAME

(75) Inventors: Fay M Sommer, Ann Arbor, MI (US); Walter F Zawacki, Canton, MI (US)

(73) Assignee: Flint Group, Ann Arbor, MI (US)

( * ) Notice: Subject to any disclaimer, the term of this patent is extended or adjusted under 35 U.S.C. 154(b) by 16 days.

(21) Appl. No.: 10/627,041

(22) Filed: Jul. 25, 2003

(65) Prior Publication Data

US 2005/0018024 A1  Jan. 27, 2005

(51) Int. Cl.
  *B41J 2/01* (2006.01)

(52) U.S. Cl. ............ 347/100; 347/95; 106/31.13; 106/31.27

(58) Field of Classification Search ........ 347/100, 347/95, 96, 98, 101, 43; 106/31.13, 31.27, 106/31.6; 523/160
See application file for complete search history.

(56) References Cited

U.S. PATENT DOCUMENTS

| 5,656,331 | A | 8/1997 | Kline |
| 6,610,131 | B1 | 8/2003 | Harris et al. |
| 6,712,449 | B1 * | 3/2004 | Smith .................. 347/101 |
| 2003/0116055 | A1 * | 6/2003 | Kubota et al. .......... 106/31.27 |
| 2003/0200887 | A1 | 10/2003 | Harris et al. |

OTHER PUBLICATIONS

Mitsuo Kaji et al., "Colorimetric Characteristics of Process Color Prints Produced Under the Japan Color Conditions," Recent Progress in Color Management and Communications, Online 1998, pp. 62–68, XP002306034, IST.
David McDowell, "Printing Aims," IPA Bulletin Online 2002, pp. 40–44, XP002306035, IPA Standards Committee.

* cited by examiner

*Primary Examiner*—Manish S. Shah
(74) *Attorney, Agent, or Firm*—Harness, Dickey & Pierce, P.L.C.

(57) ABSTRACT

A four-color ink set capable of printing an expanded color gamut has a cyan ink that prints on a reference substrate with CIELAB colorimetric aim values of $L^*=54$, $a^*=-41$, and $b^*=-45$, within a $\Delta E^*_{ab} \leq 8$; a magenta ink that prints on the reference substrate with CIELAB colorimetric aim values of $L^*=52$, $a^*=79$, and $b^*=-9$, within a $\Delta E^*_{ab} \leq 8$; a yellow ink that prints on the reference substrate with CIELAB colorimetric aim values of $L^*=90$, $a^*=-7$, and $b^*=102$, within a $\Delta E^*_{ab} \leq 10$; and a black ink. Obtaining a profile for the expanded gamut ink set, for example an International Color Consortium (ICC) profile, that relates tone values for the ink set to colorimetric values for the printed ink allows the printer to obtain the maximum benefit of the expanded color gamut. The profile for the ink set is applied in a color separation process prior to printing the image on press.

19 Claims, 2 Drawing Sheets

INK SET WITH EXPANDED COLOR GAMUT AND PROCESS FOR USING SAME

FIELD OF THE INVENTION

The present invention relates to four-color process printing inks and methods and color separations for printing with such process printing inks.

BACKGROUND OF THE INVENTION

Process printing is used with different kinds of printing operations, such as lithographic, flexographic, gravure, digital, and other printing processes. In general, the process color set has four colors—black, cyan, magenta, and yellow. Full-color prints are made by color separating the original image into tone values of the process colors. The color separations are printed sequentially to produce the full-color print of the original image.

Sometimes a four-color ink set cannot reproduce the full gamut of colors of the original image. When a truer color reproduction is desired, sometimes one or more "spot colors," or inks having a specific desired color, are printed in a further step. Another solution has been to use ink sets with more ink colors, for example six- and seven-member ink sets. Examples of such augmented sets are described in Herbert et al., U.S. Pat. No. 5,734,800 (six-color ink set); Bernasconi, U.S. Pat. No. 5,751,326 (seven-color separation process); and Alderliefste, WO 02/071739 (six-color ink set). While using spot colors and bigger ink sets can reproduce an image with more color fidelity, these solutions are more expensive because each additional ink color requires another printing unit on the press. Further, spot color printing units need to be cleaned out when the printing job for which it was employed is completed. Six- and seven-member ink sets are likewise more expensive, because they also require additional printing units on the press.

It would thus be desirable to have a four-color ink set that was capable of reproducing more colors so that a truer image could be obtained without resorting to spot colors or to larger ink sets.

SUMMARY OF THE INVENTION

We have now invented a four color ink set capable of printing an expanded color gamut. The ink set can reproduce color images with improved color fidelity to the original without resorting to spot colors or larger ink sets. The ink set has a cyan ink that prints with CIELAB colorimetric aim values of $L^*=54$, $a^*=-41$, and $b^*=-45$, within a $\Delta E^*_{ab} \leq 8$, as measured on a reference substrate; a magenta ink that prints (again on the reference substrate) with CIELAB colorimetric aim values of $L^*=52$, $a^*=79$, and $b^*=-9$, within a $\Delta E^*_{ab} \leq 8$; a yellow ink that prints (again on the reference substrate) with CIELAB colorimetric aim values of $L^*=90$, $a^*=-7$, and $b^*=102$, within a $\Delta E^*_{ab} \leq 10$; and a black ink. The colorimetric aim values are each measured on a reference substrate that conforms to the ISO 2846 series of standards (e.g., APCO II/II, reference substrate under present standard ISO 2846-1:1997). The $L^*a^*b^*$ values are measured according to international standard method ISO 13655.

The invention also provides a method of printing a color image using an ink set of the invention. The image has improved color fidelity to the original without resorting to spot colors. In one embodiment, the printing process includes providing a color separation of the image based on the color characteristics of the ink set of the invention. A color target, for example an industry standard target such as IT8.7/3 or ECI 2002, with known tone values of cyan, magenta, yellow, and black is printed on a substrate using the four-color process ink set of the invention. A color profile, for example an International Color Consortium (ICC) profile, of the ink on the substrate is created from the print according to known methods. The methods basically measure color data for the known tone values of the target and create a profile that relates tone values for the ink set to colorimetric values for the printed ink, allowing an image to be adjusted for the characteristics of the specific ink set for better fidelity in printing the image. The profile for the ink set is applied in a color separation process prior to printing the image on press. Obtaining a profile on the substrate for the expanded gamut ink set allows the printer to obtain the maximum benefit of the expanded color gamut.

The preferred Status T optical densities to obtain the $L^*a^*b^*$ CIELAB values on the reference substrate are about 1.5 for the cyan, about 1.5 for the magenta, and about 1.15 for the yellow ink. The densitometric measurements are made in accordance with ANSI CGATS.4-1993 (reaffirmed 1998).

The invention also provides a color print with improved color fidelity that is obtained by the methods of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
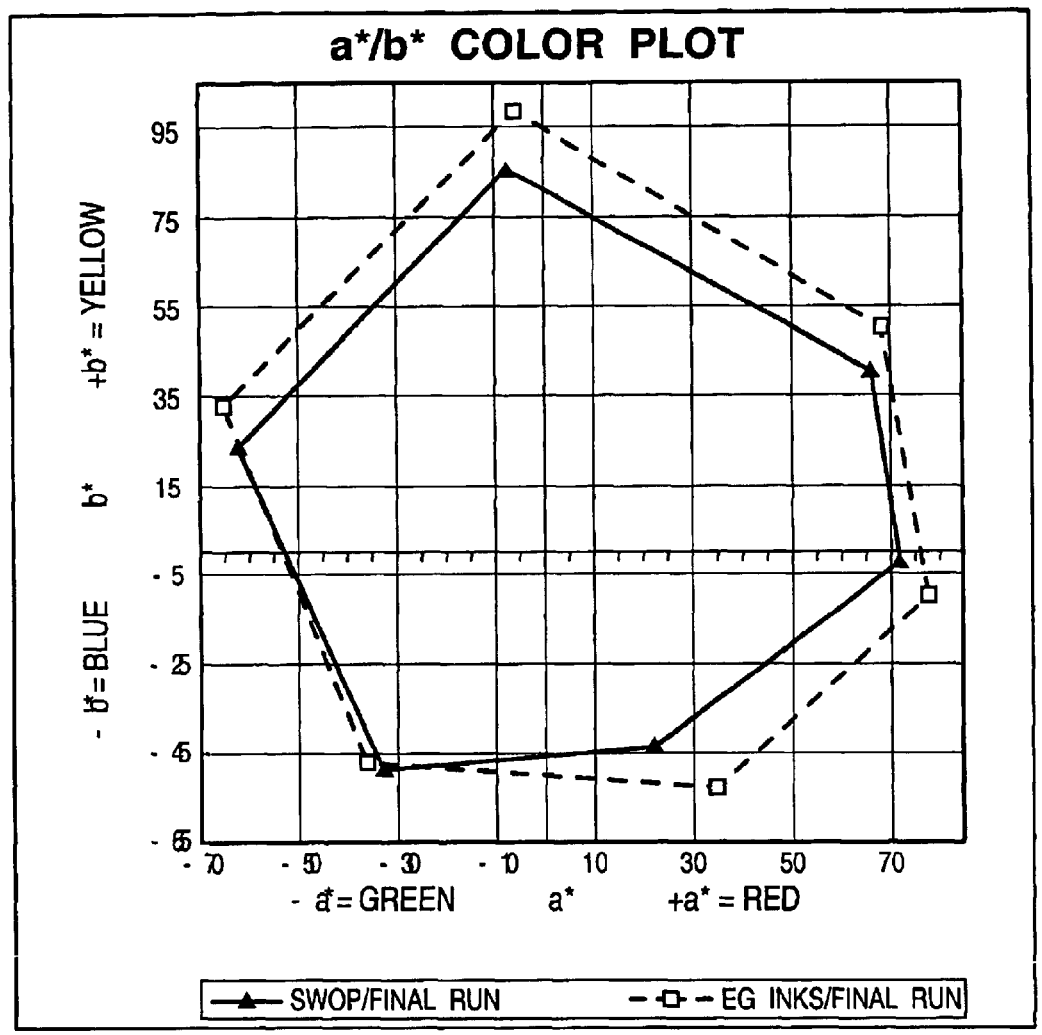
FIG. 1 is a graph showing the relationship between the color gamut of a SWOP four-color process ink set and the color gamut of the four-color process ink set to the invention and FIG. 2 is a graph showing the relationship between the color gamut of the Hexachrome six-color process ink set and the color gamut of the four-color process ink set to the invention.

The following description of the preferred embodiment(s) is merely exemplary in nature and is in no way intended to limit the invention, its application, or uses.

The ink set of the invention has a cyan ink that prints, as measured on a reference substrate, with CIELAB colorimetric aim values of $L^*=54$, $a^*=-41$, and $b^*=-45$, within a $\Delta E^*_{ab} \leq 8$; a magenta ink that prints, as measured on the reference substrate, with CIELAB colorimetric aim values of $L^*=52$, $a^*=79$, and $b^*=-9$, within a $\Delta E^*_{ab} \leq 8$; a yellow ink that prints, as measured on the reference substrate, with CIELAB colorimetric aim values of $L^*=90$, $a^*=-7$, and $b^*=102$, within a $\Delta E^*_{ab} \leq 10$; and a black ink. The colorimetric aim values are measured according to international standard method ISO 13655 on a reference substrate that conforms to the ISO 2846 series of standards (e.g., APCO II/II, reference substrate under present standard ISO 2846-1:1997). The colorimetric aim values may, of course, be expressed in other coordinates or for other substrates, but $L^*a^*b^*$ coordinates and the ISO 2846 series substrate are convenient, recognized standards in this area of technology.

The invention further provides a method of increasing color gamut, and an ink set having increased color gamut, in which a four-color ink set includes one or two of the above magenta, yellow, or cyan inks, especially includes at least the magenta ink. While the color gamut is expanded to the degree that it is when all of the magenta, yellow, or cyan inks as described are included in a four-color ink set, even including one of the inks will increase the color gamut over the standard SWOP colors.

The particular ink set compositions are formulated not only to achieve the print aim values, but also according to the desired type of ink and the printing equipment with which it will be used. For example, and without limitation, the ink set may be printed by lithographic, flexographic, gravure, digital, and other printing processes. The compositions of the ink set may also be heat set or cold set, or formulated for sheet fed or web printing. The selection of varnishes or vehicles that provide the desired properties for these kinds of inks may also affect color development of colorants, particularly pigments, in the ink compositions. The specific colorant or colorant combinations used in the inks of the ink set can, for these reasons, vary with the type of ink and printing process. The colorants, which may include one or more fluorescent materials, are selected to provide the required CIELAB colorimetric aim values for a print of that ink on the reference substrate, as described above. The principle of fluorescence is well-understood and has been used in process colors to create brighter or more saturated print colors.

The greatest volume of color space, and hence the greatest color fidelity in printing, is obtained by printing with the four color ink set of the invention using color separations tailored to this ink set. In a preferred method, a color target having areas of known color values representing the color spectrum, such as an IT8.7/3 target or ECI 2002 target, is printed with the ink set of the invention. The target is preferably printed under the same conditions—including press conditions and paper stock or other substrate—as the intended printed product. A conventional AM-screening (amplitude-modulated screening) process may be used. In a preferred embodiment, an FM-screening (frequency-modulated screening) or stochastic screening process is used.

Referring now to FIG. 1, the graph shows the color gamut boundaries on a CIELAB Diagram of the SWOP four-color process ink set (solid line) and of an example of the present four-color process ink set (dashed line) in which the cyan ink printed on the reference substrate with CIELAB colorimetric aim values of $L^*=54$, $a^*=-41$, and $b^*=-45$; the magenta ink printed on the reference substrate with CIELAB colorimetric aim values of $L^*=52$, $a^*=79$, and $b^*=-9$; and the yellow ink printed on the reference substrate with CIELAB colorimetric aim values of $L^*=90$, $a^*=-7$, and $b^*=102$. While the CIELAB Diagram is a two-dimensional projection of a three-dimensional color space showing the outermost RGB-CMY points, one can see by this diagram that the present four-color process ink set allows a significant increase in the gamut of accurate color reproduction over the standard SWOP color set. On a CIELAB Diagram, the four-color process ink set of the invention can have an increase in color gamut area over the SWOP four-color ink set of about 20% or more; a preferred embodiment of the invention has an increase in color gamut area over the SWOP set of about 25% or more.

Figure 2:
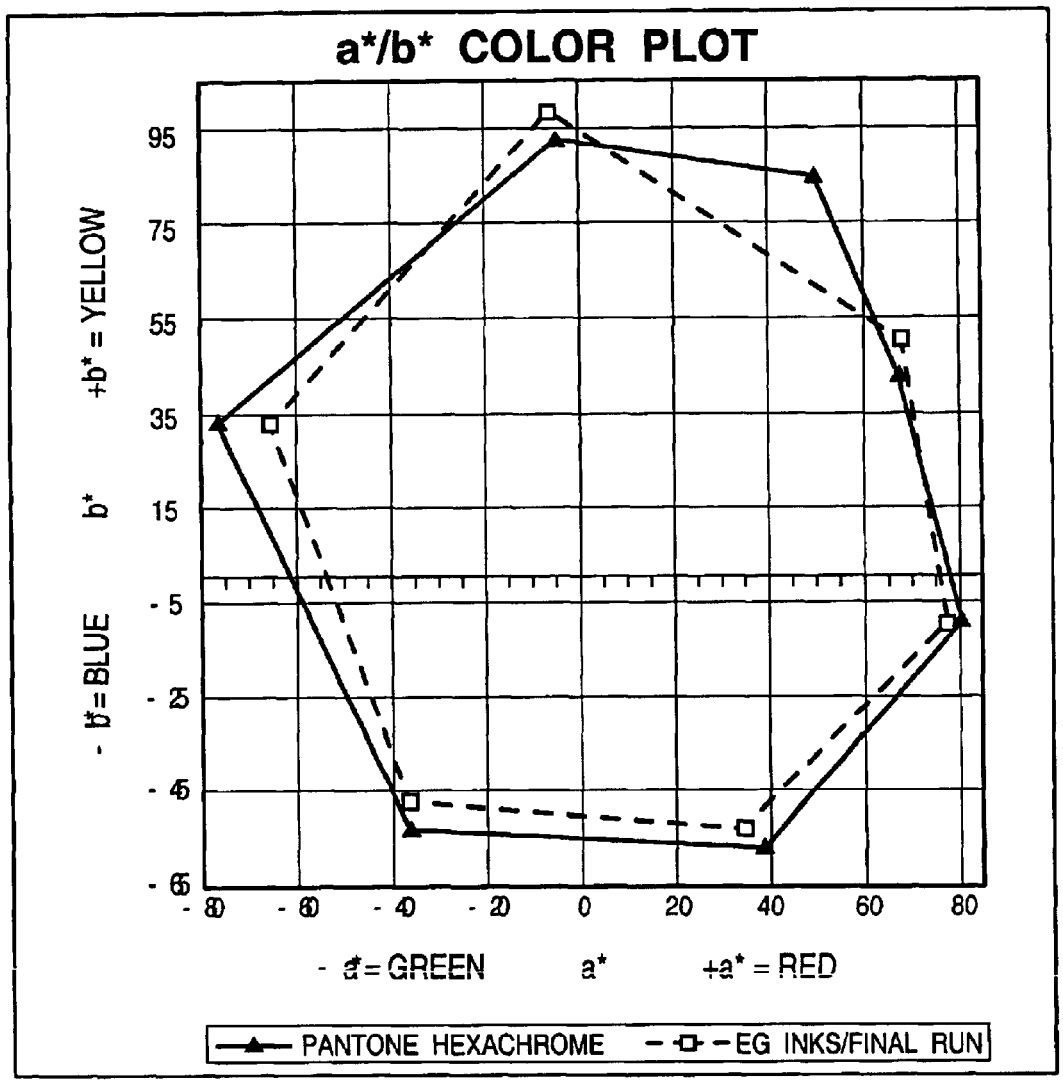

FIG. 2 compares the color gamut of the Hexachrome six-color process ink set (solid line) and of the example of the present four-color process ink set (dashed line) used for FIG. 1. While the Hexachrome ink set offers a slightly larger color gamut, the present four-color process ink set can accurately reproduce colors in nearly as large of a gamut, without the significant cost of two additional printing units and without the more-complicated six-way color separation. On a CIELAB Diagram, the four-color process ink set of the invention can have a color gamut area that is at least about 85% of the color gamut area available with the Hexachrome ink set. In a preferred embodiment, the four-color process ink set of the invention has a color gamut area that is at least about 88% of the color gamut area available with the Hexachrome ink set. Although the color gamut of the inventive ink set may vary somewhat depending on the particular CIELAB colorimetric aim values of the cyan, magenta, and yellow inks within the specified ranges, the color gamut area of a CIELAB Diagram for the four-color process ink set of the invention in general is from about 85% to about 90% of the color gamut area of a CIELAB Diagram for the Hexachrome ink set. In comparison, the color gamut area of a CIELAB Diagram for the four-color SWOP ink set is about 70% of the color gamut area of a CIELAB Diagram for the Hexachrome ink set.

In the printing process of the invention, a printer performs a profiling run by printing a test target, such as the IT8.7/3 target or ECI 2002 target, using the four-color process ink set of the invention. The inks are printing at preselected colorimetric values or optical densities. The test target print is then measured with a color measurement device, such as a spectrophotometer or calorimeter, to obtain colorimetric data for each color area of the test target print. The colorimetric data is used to create a color profile. Profiling software is commercially available, for example software for creating an ICC profile. A profile converts image information from one color space to another and adjusts for the characteristics of the specific four-color ink set. It is an advantage of the invention that commercial or other profiling software already developed for SWOP or other four-color ink sets can be used without further modification with the four-color ink sets of the invention. The profile provides information during color separation on which combination of the four inks provides the most accurate match for a given color in a design. It is desirable to also measure print characteristics information, including, without limitation, tone value increase (also called dot gain), trap percentages, and print contrasts.

The printer applies the profile to a design to make color separations to reproduce the design from the four-color ink set. The design may be created from a variety of originals, including photographic, transparent, and digital images, color separations, colored type, and other graphics. The originals can contain colors that are beyond the color gamut of standard SWOP ink sets for the substrate to be printed. If the printing process requires an image carrier, for example a printing plate, it can be made in the usual way using the profile created for the four-color process ink set of the invention. The printer prints the design using the profile for the four-color process ink set of the invention at preselected colorimetric values or optical densities on the substrate to be printed. The four-color process ink set of the invention will accurately reproduce colors that would have been out of gamut for previously known four-color process ink sets such as SWOP and more closely reproduce still other colors.

The process of the invention can be carried out for any printing process, including flexography, lithography, gravure processes, and digital printing processes. For best color accuracy, it is important that the press run to print the test target, from which the color profile is derived, is conducted under the operating conditions of that press that will be used for printing the desired prints. For example, best color reproduction is obtained when the test target and the desired prints are printed on the same substrate to the same colorimetric values or optical densities. The print characteristics (e.g., tone value increase/dot gain, trap percentages, densities, color sequence, and print contrast) should also be the same for test target and desired prints. If the substrate, the type of ink (e.g., heat set or cold set), or press is changed, then it may be necessary to prepare a new color profile to assure the most accurate color reproduction.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A four-color ink set, comprising:
   a cyan ink that prints, as measured on a reference substrate, with CIELAB colorimetric aim values of $L^*=54$, $a^*=-41$, and $b^*=-45$, within a $\Delta E^*_{ab} \leq 8$;
   a magenta ink that prints, as measured on the reference substrate, with CIELAB colorimetric aim values of $L^*=52$, $a^*=79$, and $b^*=-9$, within a $\Delta E^*_{ab} \leq 8$;
   a yellow ink that prints, as measured on the reference substrate, with CIELAB colorimetric aim values of $L^*=90$, $a^*=-7$, and $b^*=102$, within a $\Delta E^*_{ab} \leq 10$;
   and a black ink.

2. A four-color ink set according to claim 1, wherein the inks have Status T optical densities of about 1.5 for the cyan ink, about 1.5 for the magenta ink, and about 1.15 for the yellow ink.

3. A four-color ink set according to claim 1, wherein the inks are heat set inks.

4. A four-color ink set according to claim 1, wherein the inks are cold set inks.

5. A four-color ink set according to claim 1, wherein one or more of the inks comprise one or more fluorescent materials.

6. A four-color ink set according to claim 1, wherein the four-color ink set has an increase in color gamut area over the SWOP four-color ink set of about 20% or more, as measured on a CIELAB Diagram.

7. A four-color ink set according to claim 1, wherein the four-color ink set has an increase in color gamut area over the SWOP four-color ink set of about 25% or more, as measured on a CIELAB Diagram.

8. A four-color ink set according to claim 1, wherein the four-color ink set has a color gamut area at least about 85% of the color gamut area available with the Hexachrome ink set, as measured on a CIELAB Diagram.

9. A four-color ink set according to claim 1, wherein the four-color ink set has a color gamut area at least about 88% of the color gamut area available with the Hexachrome ink set, as measured on a CIELAB Diagram.

10. A four-color ink set according to claim 1, wherein the four-color ink set has a color gamut area of from about 85% to about 90% of the color gamut area available with the Hexachrome ink set, as measured on a CIELAB Diagram.

11. A method of printing a color image, comprising
   providing a color separation of the image based on a four-color ink set comprising:
   a cyan ink that prints, as measured on a reference substrate, with CIELAB colorimetric aim values of $L^*=54$, $a^*=-41$, and $b^*=-45$, within a $\Delta E^*_{ab} \leq 8$;
   a magenta ink that prints, as measured on the reference substrate, with CIELAB colorimetric aim values of $L^*=52$, $a^*=79$, and $b^*=-9$, within a $\Delta E^*_{ab} \leq 8$;
   a yellow ink that prints, as measured on the reference substrate, with CIELAB colorimetric aim values of $L^*=90$, $a^*=-7$, and $b^*=102$, within a $\Delta E^*_{ab} \leq 10$;
   and a black ink,
   and printing the color image with the four-color ink set according to the color separation.

12. A method according to claim 11, wherein the step of providing a color separation of the image based on the four-color ink set comprises a step of applying a color profile in the color separation process.

13. A method according to claim 12, wherein the color profile is a profile on a substrate on which the color image is printed.

14. A method according to claim 12, wherein the color profile is obtained by printing a color target using the same press conditions that are used to print the color image.

15. A method according to claim 11, wherein the printing step comprises printing by a lithographic, flexographic, gravure, or digital printing process.

16. A method according to claim 11, wherein the printing step comprises sheet fed printing.

17. A method according to claim 11, wherein the printing step comprises web printing.

18. A method according to claim 11, wherein the color image comprises a color that cannot be obtained using a standard SWOP ink set but that is within the color gamut of the four-color ink set.

19. A four-color ink set, comprising a cyan ink, a magenta ink, a yellow ink, and a black ink, wherein the ink set comprises at least one member selected from the group consisting of:
   a cyan ink that prints, as measured on a reference substrate, with CIELAB colorimetric aim values of $L^*=54$, $a^*=-41$, and $b^*=-45$, within a $\Delta E^*_{ab} \leq 8$,
   a magenta ink prints, as measured on a reference substrate, with CIELAB colorimetric aim values of $L^*=52$, $a^*=79$, and $b^*=-9$, within a $\Delta E^*_{ab} \leq 8$, and
   a yellow ink prints, as measured on a reference substrate, with CIELAB colorimetric aim values of $L^*=90$, $a^*=-7$, and $b^*=102$, within a $\Delta E^*_{ab} \leq 10$.

* * * * *